United States Patent
Stelzig (10) Patent No.: US 8,468,131 B2
(45) Date of Patent: Jun. 18, 2013

(54) CONNECTING DEVICES IN A PEER-TO-PEER NETWORK WITH A SERVICE PROVIDER

(75) Inventor: James Andrew Stelzig, Gatineau (CA)

(73) Assignee: Avaya Canada Corp., Halifax (CA)

( * ) Notice: Subject to any disclaimer, the term of this patent is extended or adjusted under 35 U.S.C. 154(b) by 363 days.

(21) Appl. No.: 11/427,403

(22) Filed: Jun. 29, 2006

(65) Prior Publication Data

US 2008/0005056 A1    Jan. 3, 2008

(51) Int. Cl.
*G06F 7/00* (2006.01)
*H04L 12/56* (2006.01)
*H04L 12/28* (2006.01)
*H04Q 11/00* (2006.01)

(52) U.S. Cl.
USPC ......... 707/622; 370/237; 370/259; 370/395.3

(58) Field of Classification Search
USPC ..................... 707/622; 370/237, 259, 395.3
See application file for complete search history.

(56) References Cited

U.S. PATENT DOCUMENTS

| | | | |
|---|---|---|---|
| 6,502,109 B1 * | 12/2002 | Aravamudan et al. ............... 1/1 |
| 6,505,216 B1 | 1/2003 | Schutzman et al. ........... 707/204 |
| 6,584,108 B1 | 6/2003 | Chung et al. ................... 370/401 |
| 6,590,969 B1 * | 7/2003 | Peters et al. ............. 379/211.02 |
| 7,284,099 B2 * | 10/2007 | Hassan ........................... 711/154 |
| 7,577,150 B2 * | 8/2009 | Poustchi et al. ............ 370/395.3 |
| 7,688,804 B2 * | 3/2010 | Peters ............................ 370/352 |
| 7,796,520 B2 * | 9/2010 | Poustchi et al. .............. 370/236 |
| 7,940,781 B2 * | 5/2011 | Poustchi et al. .............. 370/401 |
| 2002/0133534 A1 * | 9/2002 | Forslow ......................... 709/200 |
| 2002/0167946 A1 * | 11/2002 | Gallant .......................... 370/389 |
| 2003/0108002 A1 * | 6/2003 | Chaney et al. ................. 370/261 |
| 2003/0112956 A1 * | 6/2003 | Brown et al. ............. 379/221.01 |
| 2003/0163702 A1 | 8/2003 | Vigue et al. ................... 713/176 |
| 2003/0200298 A1 * | 10/2003 | Su et al. ........................ 709/223 |

(Continued)

FOREIGN PATENT DOCUMENTS

| EP | 0993163 | 4/2000 |
|---|---|---|
| EP | 0794650 | 12/2004 |

(Continued)

OTHER PUBLICATIONS

The Internet Society, Request for Comments 3515 Session Initiation Protocol Refer Method by, Apr. 2003, The Internet Society.*

(Continued)

*Primary Examiner* — Rehana Perveen
*Assistant Examiner* — Huen Wong
(74) *Attorney, Agent, or Firm* — Muncy, Geissler, Olds & Lowe, PLLC (57) ABSTRACT

Communication between a service provider and a plurality of devices on a peer-to-peer network are enabled. One of the plurality of devices on the peer-to-peer network is selected for receiving invitations for media sessions with any of the plurality of devices from the service provider. The selected device transmits a registration message to the service provider indicating a unique address of the selected device to which invitations are to be sent. The unique address is associated with a first identifier for at least one of the plurality of devices by the service provider. Another one of the plurality of devices is selected in place of the selected device to receive subsequent invitations for media session upon detection of a reselection condition.

25 Claims, 9 Drawing Sheets

U.S. PATENT DOCUMENTS

| | | | |
|---|---|---|---|
| 2003/0227942 A1* | 12/2003 | Maher et al. | 370/468 |
| 2004/0008683 A1* | 1/2004 | Cloonan et al. | 370/395.4 |
| 2004/0095912 A1* | 5/2004 | Gao et al. | 370/338 |
| 2004/0111519 A1* | 6/2004 | Fu et al. | 709/229 |
| 2004/0133641 A1* | 7/2004 | McKinnon et al. | 709/204 |
| 2004/0181689 A1* | 9/2004 | Kiyoto et al. | 713/201 |
| 2004/0203783 A1* | 10/2004 | Wu et al. | 455/436 |
| 2004/0233866 A1* | 11/2004 | Bossoli et al. | 370/328 |
| 2004/0240656 A1* | 12/2004 | Poustchi | 379/220.01 |
| 2005/0036482 A1* | 2/2005 | Goroshevsky et al. | 370/352 |
| 2005/0044127 A1* | 2/2005 | Jaiswal et al. | 709/200 |
| 2005/0141694 A1* | 6/2005 | Wengrovitz | 379/265.09 |
| 2005/0190746 A1* | 9/2005 | Xiong et al. | 370/352 |
| 2005/0201304 A1* | 9/2005 | Olshansky | 370/282 |
| 2005/0237978 A1* | 10/2005 | Segal | 370/331 |
| 2006/0026288 A1* | 2/2006 | Acharya et al. | 709/227 |
| 2006/0034195 A1* | 2/2006 | Blaiotta et al. | 370/261 |
| 2006/0126594 A1* | 6/2006 | Tu | 370/352 |
| 2006/0153357 A1* | 7/2006 | Acharya et al. | 379/266.01 |
| 2006/0187900 A1* | 8/2006 | Akbar | 370/352 |
| 2006/0189340 A1* | 8/2006 | Sung et al. | 455/518 |
| 2006/0271626 A1* | 11/2006 | Tidwell et al. | 709/204 |
| 2006/0288120 A1* | 12/2006 | Hoshino et al. | 709/238 |
| 2007/0004400 A1* | 1/2007 | McClung | 455/426.1 |
| 2007/0111723 A1* | 5/2007 | Ahmed et al. | 455/426.1 |

FOREIGN PATENT DOCUMENTS

| | | |
|---|---|---|
| WO | WO 00/17738 | 3/2000 |
| WO | WO 01/06367 | 1/2001 |
| WO | WO 01/17265 | 3/2001 |
| WO | WO 01/86633 | 11/2001 |
| WO | WO 03/044662 | 5/2003 |
| WO | WO 2004/057485 | 7/2004 |

OTHER PUBLICATIONS

The Internet Society, Request for Comments 3261 Session Initiation Protocol Refer Method by The Internet Society, Jun. 2002, The Internet Society.*

Mintz-Habib et al., A VoIP Emergency Services Architecture and Prototype, 2005, Columbia University, pp. 523-528.*

Chen et al., A Push-Based VoIP Service for an Internet-Enabled Mobile Ad Hoc Network, 2006, Proceedings of 3rd IEEE VTS Asia Pacific Wireless Comm. Symposium, IEEE Computer Society Press, pp. 1-5.*

Business Wire, Popular Telephony Announces a PBX-Less Peer-to-Peer IP Phone for the SMB Market, Feb. 21, 2006, Business Wire.*

Business Wire, Popular Telephony Announces the Commercial Availability of PeerioBiz with Gateway for Skype Peer-to-Peer VoIP System for SoHo, May 24, 2005, Business Wire.*

Mei et al., "Method of IMS B@BUA processing REFER to retain Caller-ID", Oct. 23, 2007, Motorola Inc.*

Magedanz et al., "Mobility Aware Technologies and Applications", 2005, Springer.*

* cited by examiner

CONNECTING DEVICES IN A PEER-TO-PEER NETWORK WITH A SERVICE PROVIDER

BACKGROUND

In a typical VoIP (Voice over Internet Protocol) system, a PBX (private branch exchange) interfaces between devices (e.g. IP (Internet Protocol) telephones, video homes, wireless devices, etc.) on a network and an interface with a PSTN (public switched telephone network). The PBX acts as a single receiving point for all devices on the network for invitations for media sessions (e.g. incoming calls). The PBX then routes these incoming invitations to devices on the network to which the invitations are addressed. All outgoing media session invitations from the devices may also be routed through the PBX who will handle any authentication requests from the interface before the outgoing media session invitations are accepted for forwarding to the PSTN. The PBX is the single point of connectivity between the interface and the devices on the network.

In a peer-to-peer (P2P) network there is no PBX or other similar device to route invitations for media sessions and act as the single point of connectivity. However, many interfaces expect and/or require such a single point of connectivity.

SUMMARY OF THE INVENTION

In accordance with one aspect there is provided a method for enabling communication between a service provider and a plurality of devices on a peer-to-peer network, said method comprising: selecting one of the plurality of devices on the peer-to-peer network for receiving invitations for media sessions with any of the plurality of devices from the service provider; transmitting a registration message to the service provider indicating a unique address of the selected device to which invitations are to be sent, the unique address being associated with a first identifier for at least one of the plurality of devices by the service provider; and selecting another one of the plurality of devices, in place of the selected device, to receive subsequent invitations for media session upon detection of a reselection condition.

In accordance with another aspect there is a method for enabling communication between a service provider and a plurality of devices on a peer-to-peer network, said method comprising: selecting one of the plurality of devices on the peer-to-peer network for receiving invitations for media sessions with any of the plurality of devices from the service provider; transmitting a first registration message from the selected device to the service provider indicating a unique address of the selected device to which invitations are to be sent, the unique address being associated with a first identifier for at least one of the plurality of devices by the service provider; selecting another one of the plurality of devices, in place of the selected device, to receive subsequent invitations for media session upon detection of a reselection condition; transmitting a second registration message from the another selected device to the service provider indicating a unique address of the another selected device to which subsequent invitations are to be sent, the unique address being associated with the first identifier by the service provider; wherein the association of the another selected device's unique address second registration message replaces the association of the selected device's unique address.

In accordance with another aspect there is provided a device on communication with a plurality of devices on a peer-to-peer network comprising: a selection component for selecting one of the plurality of devices on the peer-to-peer network for receiving invitations for media sessions with any of the plurality of devices from a service provider, the selection component being activated for selecting one of the plurality of devices when there is not a previous selection and upon detection of a reselection condition; a registration component for transmitting a registration message to the service provider indicating a unique address of the selected device to which invitations are to be sent, the unique address being associated with a first identifier for at least one of the plurality of devices by the service provider; a receiving component for receiving and processing an invitation for a media session destined for one of the plurality of devices; and a system manager for scheduling and managing the device.

In accordance with another aspect there is provided an article of manufacture comprising: a computer usable medium having computer readable program code means embodied therein for causing enablement of communication between a service provider and a plurality of devices on a peer-to-peer network, the computer readable program code means in said article of manufacture comprising: computer readable program code means for causing a computer to select one of the plurality of devices on the peer-to-peer network for receiving invitations for media sessions with any of the plurality of devices from the service provider; computer readable program code means for causing a computer to transmit a registration message to the service provider indicating a unique address of the selected device to which invitations are to be sent, the unique address being associated with a first identifier for at least one of the plurality of devices by the service provider; and computer readable program code means for causing a computer to select another one of the plurality of devices, in place of the selected device, to receive subsequent invitations for media session upon detection of a reselection condition.

In accordance with another aspect there is provided a computer program product comprising: a memory having computer readable code embodied therein for execution by a processor, for enabling of communication between a service provider and a plurality of devices on a peer-to-peer network, the code comprising: code means for selecting one of the plurality of devices on the peer-to-peer network for receiving invitations for media sessions with any of the plurality of devices from the service provider; code means transmitting a registration message to the service provider indicating a unique address of the selected device to which invitations are to be sent, the unique address being associated with a first identifier for at least one of the plurality of devices by the service provider; and code means for selecting another one of the plurality of devices, in place of the selected device, to receive subsequent invitations for media session upon detection of a reselection condition.

DETAILED DESCRIPTION

Figure 1:
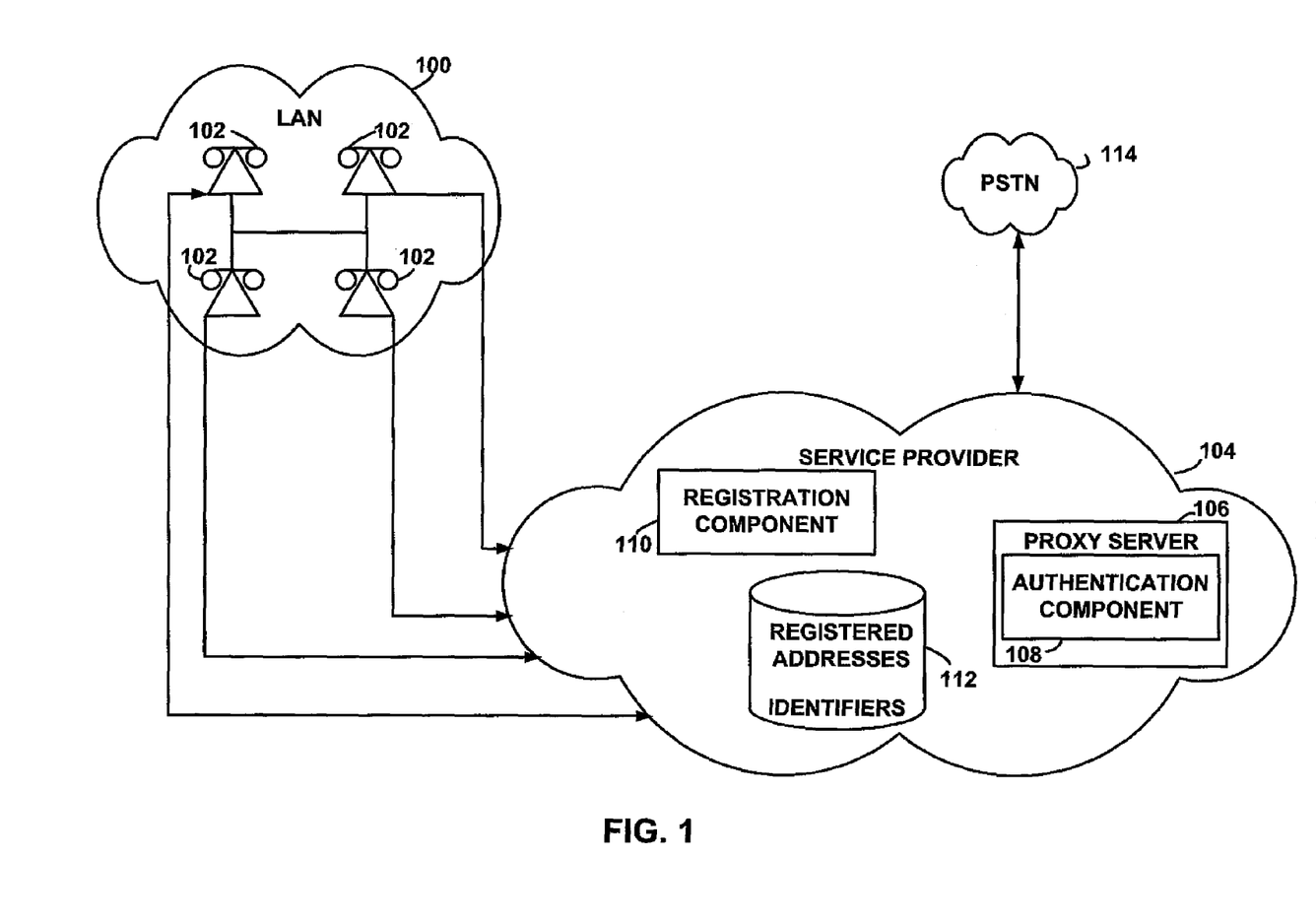
FIG. 1 is an overview of a peer-to-peer network connected to a VoIP service provider.

FIG. 1 illustrates a connection between devices 102 in a P2P network 100 and a VoIP service provider 104. VoIP functionality is provided by the service provider 104 who is often located remotely from the network 100 having the devices 102 that want to access the functionality provided by the service provider 104. In particular, the service provider 104 interfaces with a PSTN 114 to enable the devices 102 to access the PSTN 114. If the service provider 104 is remotely located from the network 100 then these two may be connected via a WAN (wide area network), such as the Internet (not shown). The service provider 104 may also be connected directly to the network 100 (either remotely located or on the same premises).

The devices 102 are media devices, such as IP telephones, video phones, PDAs (personal digital assistants), wireless devices, computers supporting voice over packet-based communications, etc. Although FIG. 1 illustrates only four devices 102, it will be easily understood that the network may have many more devices connected thereto. The network 100 may also form part of a larger network that is a collection of smaller networks interconnected, for example, by way of VPN (virtual private network) connections.

Each of the devices 102 in the network 100 has similar functionality and can communicate with the service provider 104. The device 102 can receive and/or send invitations for media sessions (such as telephone calls, video conferencing, etc.). In a case where the service provider 104 is expecting a single point of connectivity with the network 100, such as a PBX, only one of the devices 102 receives invitations for media sessions from the service provider 104 while every device 102 can communicate with the service provider 104 for outgoing communication (shown in FIG. 1). The single device 102 receiving invitations for media sessions receives all invitations destined for any device 102 on the network 100. In a case where the service provider 104 will communicate with each device 102, then the communication between the device 102 and the service provider 104 will be two way communication. It will be understood that there may be a mixture of devices 102 in the network 100 that have two-way communication and devices 102 that have one-way communication with the service provider 104.

The service provider 104 has a proxy server 106 that manages communications with the device(s) 102 on the network 100 and a registration component 110 with which the one device 102 designated to receive invitations from the service provider 104 registers itself. After the devices 102 on the network 100 have determined which device will be selected to receive invitations for media sessions, this selected device 102 informs the registration component 110 of its address for registration of this selected device 102 as the incoming point for the network 100. The registration component 110 registers the selected device 102 by associating a unique address of the selected device 102 with at least one URI (uniform resource identifier) for the network 100 and/or the devices 102 as well as any identifiers that the devices 102 and/or the network 100 may use during communications on the PSTN 114 (e.g. E.164 identities) in a data store 112. The data store 112 may be accessible to both the proxy server 106 and the registration component 110. Devices 102 that are configured for two-way communication with the service provider 104 will have a unique address (e.g. IP address) by which the proxy server 106 can contact the device 102, a PSTN identifier (e.g. E.164 identity) by which the device 102 can be contacted over the PSTN 114 via the service provider 104, and possibly a URI associated with the unique address. Selected receiving devices 102 may have multiple PSTN identifiers and possibly multiple URIs, all of which will be associated with the device's unique address. A PSTN identifier may be unique to a specific device (in the case of direct inward dialing) or may be shared among all devices (or a subset) in the network 100.

The service provider 104 receives invitations for media sessions for the devices 102 over the PSTN 114 based on the PSTN identifiers associated with the devices 102. These incoming invitations are forwarded to the selected device 102. The selected device 102 then processes the incoming invitations and transfers each invitation to a device 102 for which the invitation is addressed. Since each device 102 has a limited capacity for handling incoming invitations, when this capacity is reached another device 102 on the network 100 will be selected to be the receiving device and will register with the service provider 104. In a case where the service provider 104 will accept only a single receiving device for each PSTN identifier or URI, the registration of the other device 102 automatically unregisters the first selected device 102. Alternatively, the first selected device 102 may unregister from the proxy server 106 explicitly when it is informed that another device has been selected as the receiving device.

Any outgoing media session invitations made by the devices 102 to be sent to a destination via the PSTN 114 will be received by the proxy server 106. For these outgoing invitations, an authentication component 108 determines whether the device 102 trying to make the outgoing invitation has permission to do so via the service provider 104. Each of the devices 102 holds information on credentials given by the service provider 104 that are required for making outgoing invitation. These credentials are authenticated by the authentication component 108 before the proxy server 106 will permit the invitation to be forwarded to the PSTN 114.

Figure 2:
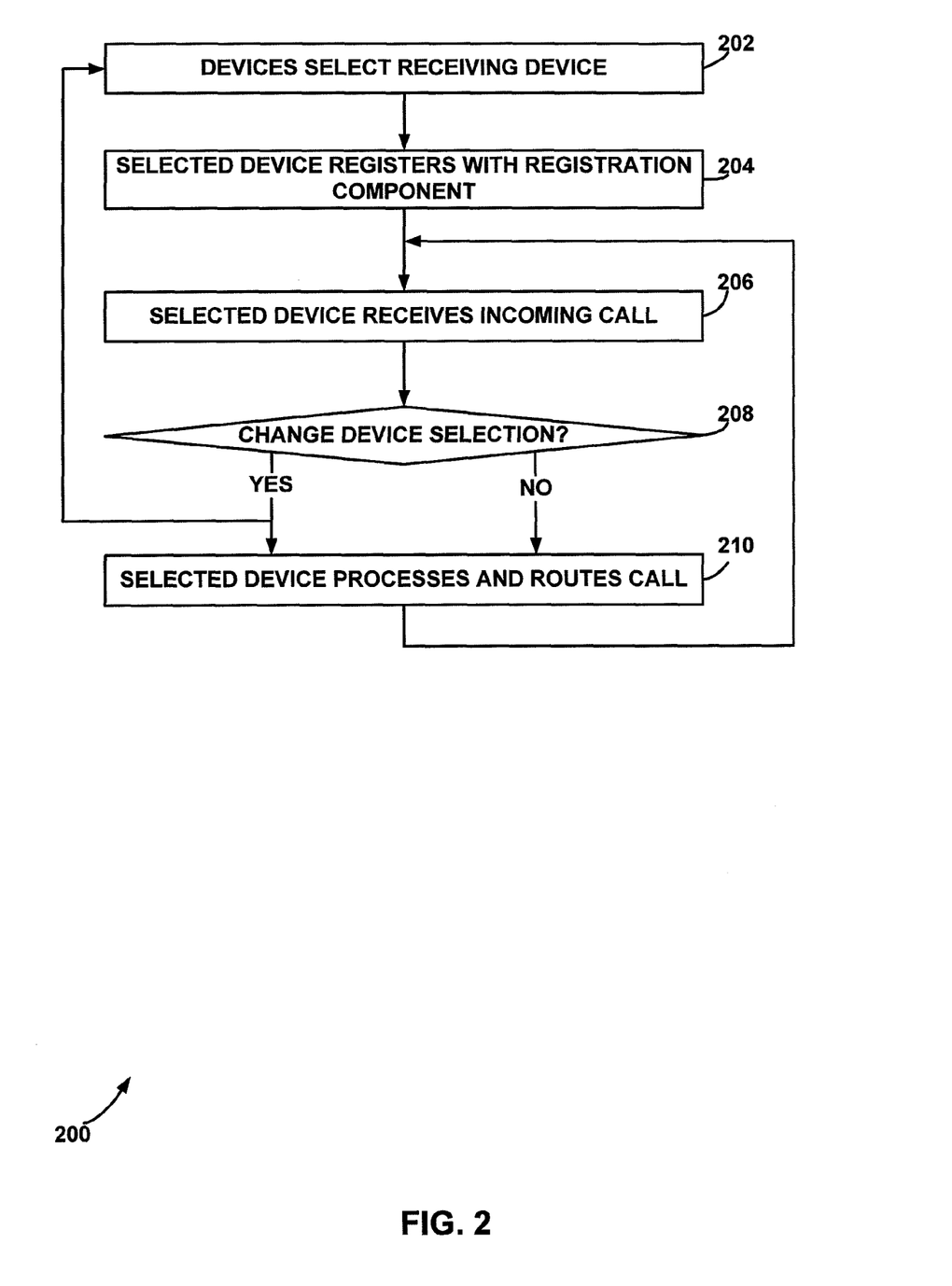
FIG. 2 is an overview of a flow for incoming invitations within the peer-to-peer network.

FIG. 2 illustrates a flow 200 in the network 100 for all incoming invitations received from the service provider 104. The flow 200 in FIG. 2 illustrates a flow in the network 100 for the case where there is only a single point through which all incoming invitations are received (i.e. a single incoming PSTN identifier/URI for the devices on the network 100). The devices 102 in the network 100 communicate to select a receiving device in step 202. In the network 100, all of the devices 102 communicate to share information and monitor the status of other devices 102 on the network 100. Such communication may occur, for example, by methods described in PCT publications WO 2005/050463, WO 2005/048531 and WO 2006/034563.

There may be different types of criteria by which one of the devices 102 is selected to be a receiving device. For example, one of the devices 102 may be automatically designated to be the receiving device when the network 100 first initializes. This designated device 102 may be, for example, the first device to connect to the network 100, the first device in a configuration where each device 102 in the network 100 is numerically ordered, the device positioned in a particular connection to the network 100 which is designated to be a first receiving device, etc.

The selected device 102 may also be determined by all of the devices 102 during communication with each other. The process of selecting a device to be the receiving device may occur according to a selection algorithm. This algorithm may select devices according to a numerical ordering of the devices 102 in the network 100, according to a response speed of each device 102 to a status poll, etc. The selection algorithm may be used not only in selection of the first receiving device but also in subsequent device selections as the job of handling incoming invitations is shared among the devices 102 to spread the load.

More elaborate selection algorithms may take into account capabilities of the devices 102 determined by, for example, announcements to the other devices 102, historical statistics, presence information, etc. The selection algorithm may also consider other criteria, such as whether or not the phone is currently idle. Simpler selection algorithms may make a selection of a device using a random number based on system uptime, location of the devices in a routing table, etc.

It will be obvious that it is possible to designate one device to always be the receiving device, thus making this device 102 function as a PBX.

The proxy server 106 expects to forward all incoming invitations to a single receiving device in the network 100. After the selection process, the selected device 102 registers with the registration component 110 in step 204 to be the receiving device for the PSTN identifier/URI associated with the devices 102 on the network 100. Once the selected device 102 has registered with the registration component 110, the selected device 102 is responsible for maintaining that registration. For example, the service provider 104 may require that registration be repeated on a periodic basis (e.g. every 20-30 seconds). The selected device 102 is responsible for continually registering with the registration component 110 until it looses, or passes on, the job of being the selected receiving device. If the selected device 102 fails to maintain this registration then either the registration has been rejected by the registration component 110, the connection between the network 100 and the service provider 104 is not working or the selected device 102 has become inactive.

The registration component 110 may reject a registration of the selected device 102 when it believes that the identity provided for the selected device 102 is not a valid identity. Such an error may be the result of a configuration error or other similar error. When a registration is rejected, the service provider 104 informs an administrator for the network 100.

If the connection between the network 100 and the service provider 104 is not working then none of the devices 102 can communicate with the service provider 104 and the service provider 104 cannot forward incoming media session invitations. The selected device 102 continues to attempt to register with the registration component 110 during this period that the connection is not working until such time as the connection is restored and registration can proceed.

Each device 102 monitors the status of other devices 102 on the network 100 to determine when a device 102 becomes inactive. When a device 102 is determined to be inactive then the device 102 that first detected the inactive status will either register with the registration component 110 effectively selecting itself as the receiving device, or initiate the selection algorithm with the other devices 102. When the inactive device becomes active again there are two devices that consider themselves to be the selected device. These two devices determine which device is to remain the selected device, possibly using one of the above selection methods.

The service provider 104 receives incoming invitations for the PSTN identifier/URI from the PSTN 114. These incoming invitations are sent to the selected device 102 by the proxy server 106 in step 206. Upon receiving the media session invitation, the selected device 102 determines if a change in which device is selected as the receiving device should be made in step 208 (e.g. should the current selected device 102 continue to be the receiving device). This change may be the result of the selected device 102 reaching its capacity to receive incoming media session invitations, or some other condition resulting in the reselection of the receiving device. If the selected device 102 is to renounce its selection then the devices 102 select another device to be the receiving device in step 202. The selected device 102 may select the next receiving device without consulting with all of the other devices 102 in the network 100.

The incoming invitation received by the selected device 102 is processed and routed according to the intended destination of the invitation in step 210. If the invitation destination is for another device 102 on the network 100 then the invitation is transferred to that destination device 102. After the invitation is transferred, the selected device 102 can act as a back-to-back user agent or a redirection server for resulting communications between the destination device 102 and the proxy server 106. The selected device 102 could also send a "refer or redirection" message to the proxy server 106 so that the proxy server 106 contact the destination device 102 directly.

The net effect of the illustrated flow 200 at the network 100 is that all incoming invitations appear to be sent to a single entity from the perspective of the service provider 104. Since the service provider 104 expects such a single receiving device, this enables the P2P network 100 and the devices 102 thereon to use the services provided by the service provider 104 without requiring the use of a PBX, or other such dedicated device, as an interface with the network 100.

In the case where each of the devices 102 has its own PSTN identifier/URI (i.e. direct inward dialing), each device 102 would be registered with the proxy server 106 and there would be no requirement for selection of a single receiving device. In this later case each device 102 would have two-way communication with the proxy server 106 as opposed to the single direction communication shown in FIG. 1 for all except for the selected device 102. For direct inward dialing each device 102 would maintain its registration with the proxy server 106. As with the case for the single receiving device, each device 102 in the network 100 monitors that status of at least one other device 102 in the network 100. If one of the devices 102 becomes inactive or is taken off of the network 100 then one of the devices 102 monitoring the status of the inactive (or missing) device 102 may register itself with the proxy server 106 as the receiving device for any media session invitations for PSTN identifier/URI of the inactive device 102.

Figure 3:
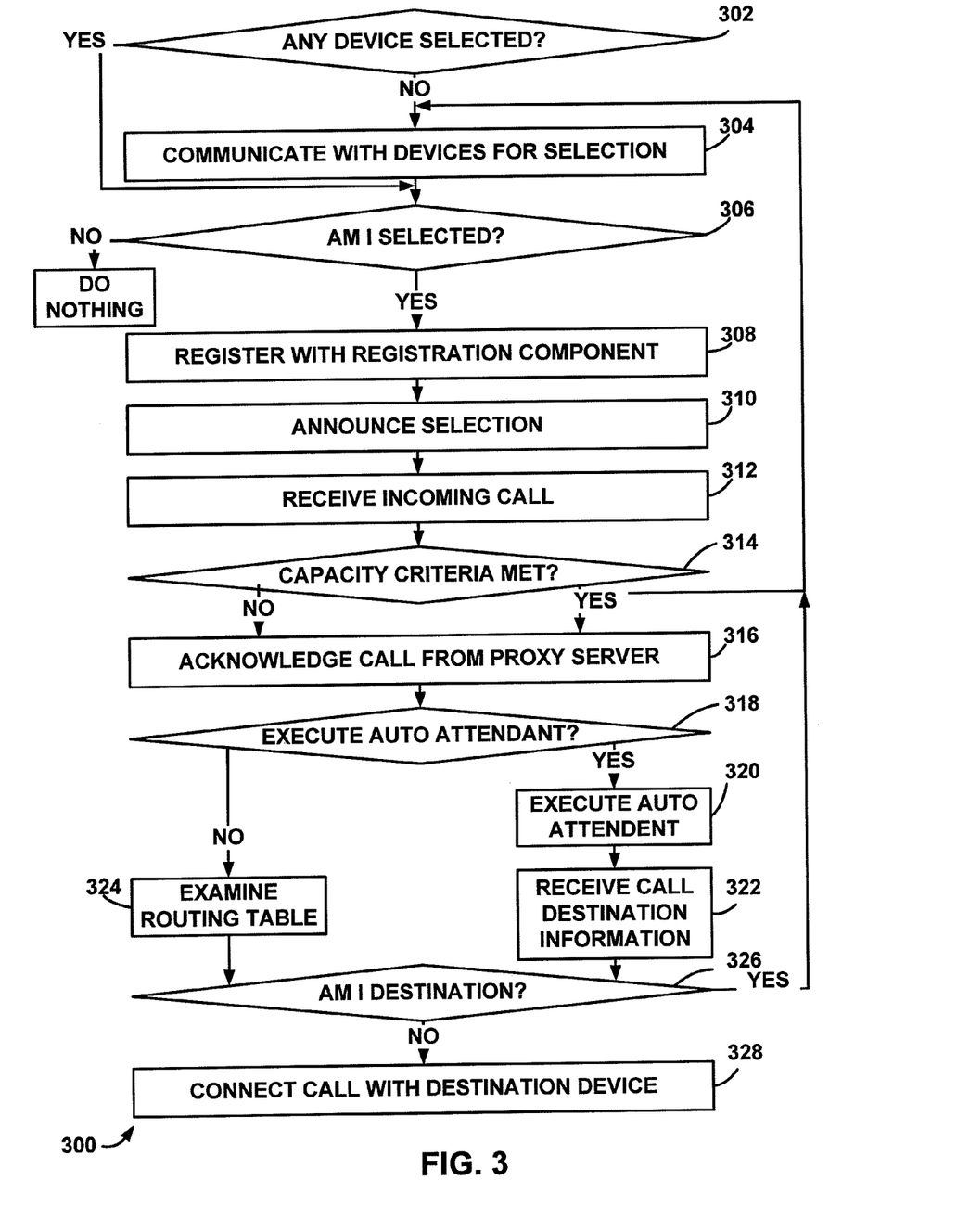
FIG. 3 is an overview of a flow for incoming invitations in the peer-to-peer network from a selected device perspective.

FIG. 3 illustrates a flow 300 in the network 100 for incoming invitations received from the service provider 104 from the perspective of one of the devices 102. The flow 300 in FIG. 3 illustrates a flow in the network 100 for the case where there is only a single point through which all incoming invitations are received for all devices 102.

The device 102 determines in step 302 if there is any device 102 on the network 100 that has been selected to receiving incoming invitations. The device 102 may send a query to all devices 102 on the network 100 to determine their status. Each device 102 will send a response indicating if they are selected as the receiving device or not.

If none of the devices 102 have been selected then the devices 102 communicate to select a receiving device in step 304. The selection of a device was previously discussed in connection with FIG. 2.

After a device has been selected in step 304, or if it is determined in step 302 that a device has been selected, the device 102 determines if it is the selected device in step 306. If the device 102 is not the selected device then no further processing is necessary at this time. The device 102 will maintain a watch on the status of surrounding devices 102 to detect if any of these devices 102 becomes inactive. If a device 102 being monitored does become inactive then the device 102 will assume any responsibilities of the inactive device 102.

If the device 102 is the selected device then it registers with the registration component 110 in step 308 to be the receiving device for the network 100. The device 102 will maintain this registration until such time as another device 102 on the network 100 is selected to be the receiving device. Maintenance of this registration may require periodic re-registration with the registration component 110 according to any requirements set up by the service provider 104.

The device 102 also announces that it has been selected as the receiving device to all of the other devices 102 in the network 100 in step 310.

The device 102 may now receive any incoming invitations from the service provider 104. When an incoming invitation is received, step 312, the device 102 determines in step 314 if its capacity criteria has been met as a result of receiving this media session invitation. The capacity criteria may be set up to take into account various factors, such as how many media session invitations the device 102 can redirect to other devices in the network 100, etc. Such a capacity limit may be set according to a limitation on the actual hardware and software of the device or according to an arbitrary limitation falling within the real limitations of the device 102. For example, the device 102 may actually have a capacity to handle three media session invitations (according to hardware and software limitations) while the capacity limit may be set to a single media session invitation so that the receiving device changes every time a media session invitation is received. If the capacity criteria of the device is met then another device 102 is selected, step 304.

The device 102 acknowledges the invitation from the proxy server 106 in step 316. The proxy server 106 forwards the media session invitation to the selected device 102 who determines how to process the invitation in step 318. If an auto-attendant is to be used then the auto-attendant executes in step 320. During execution of the auto-attendant, the device 102 obtains the destination of the invitation in step 322. Since each of the devices 102 on the network 100 has similar functionality, each device 102 may be capable of separately running an auto attendant to process invitations.

If an auto-attendant is not to be used then a routing table is used in step 324 to determine the destination of the media session invitation. The selected device 102 determines if it is the destination of the invitation in step 326. If the device 102 is the destination device 102 then another device 102 is selected to be the receiving device, step 304. The combination of the capacity criteria and the destination may be considered to be reselection conditions.

If the invitation is destined for another device 102 on the network 100 then the selected device 102 forwards the media session invitation with the destination device 102 in step 328. The selected device 102 may redirect the media session invitation and remain in the path of the communications between the proxy server 106 and the destination device 102 or the selected device 102 may inform the proxy server 106 of the destination device 102 for direct communication. If the auto-attendant is used to determine the invitation destination then step 328 may be implemented by the auto-attendant.

Figure 4:
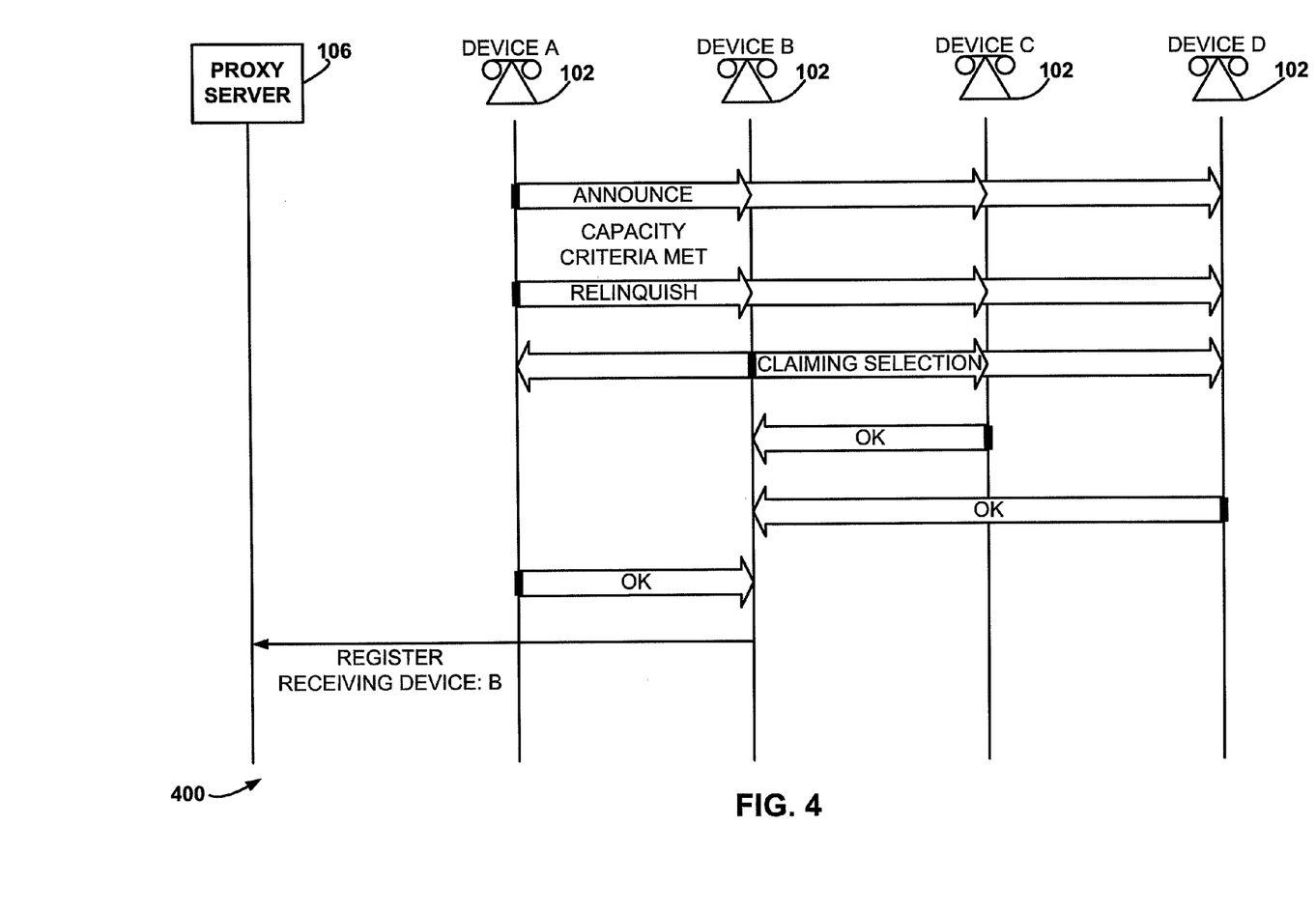
FIG. 4 is an overview of receiving device selection between devices in the peer-to-peer network.

FIG. 4 illustrates a flow 400 in the network 100 between the devices 102 for selection of a receiving device.

At some time prior, Device A has been selected to be the receiving device by one of the previously identified processes. As a result device A registers itself with the registration component 110 to be the receiving device. Device A announces to device B, device C, and device D that it is the receiving device periodically. If a new device is joined to the network 100, then it learns of the registration ownership via these announcements.

As device A receives incoming invitations, its capacity criteria will eventually be reached. When that capacity criteria is met device A will relinquish its status as the receiving device. Device A informs devices B, C and D that it is no longer the receiving device and that another device must be selected to receive incoming invitations. As previously mentioned, this selection may occur by any of a number of methods. Device relinquishment, Device A maintains its registration with the registration component 110 until another device claims the registration ownership and successfully registers with the registration component 110. If none of the devices claims this ownership, after a certain timeout period the relinquishing device re-claims the registration ownership.

In the example in FIG. 4, device B claims the status as the selected receiving device and informs devices A, C and D of this. Devices A, C and D respond to device B indicating that device B can claim that selected receiving device status.

After device B receives confirmation from the other devices that it can be the receiving device, device B registers itself with the registration component 110 as the receiving device. Device A may unregister with the registration component 110 if the registration component 110 does not automatically overwrite the registration entry with the new registration.

Figure 5:
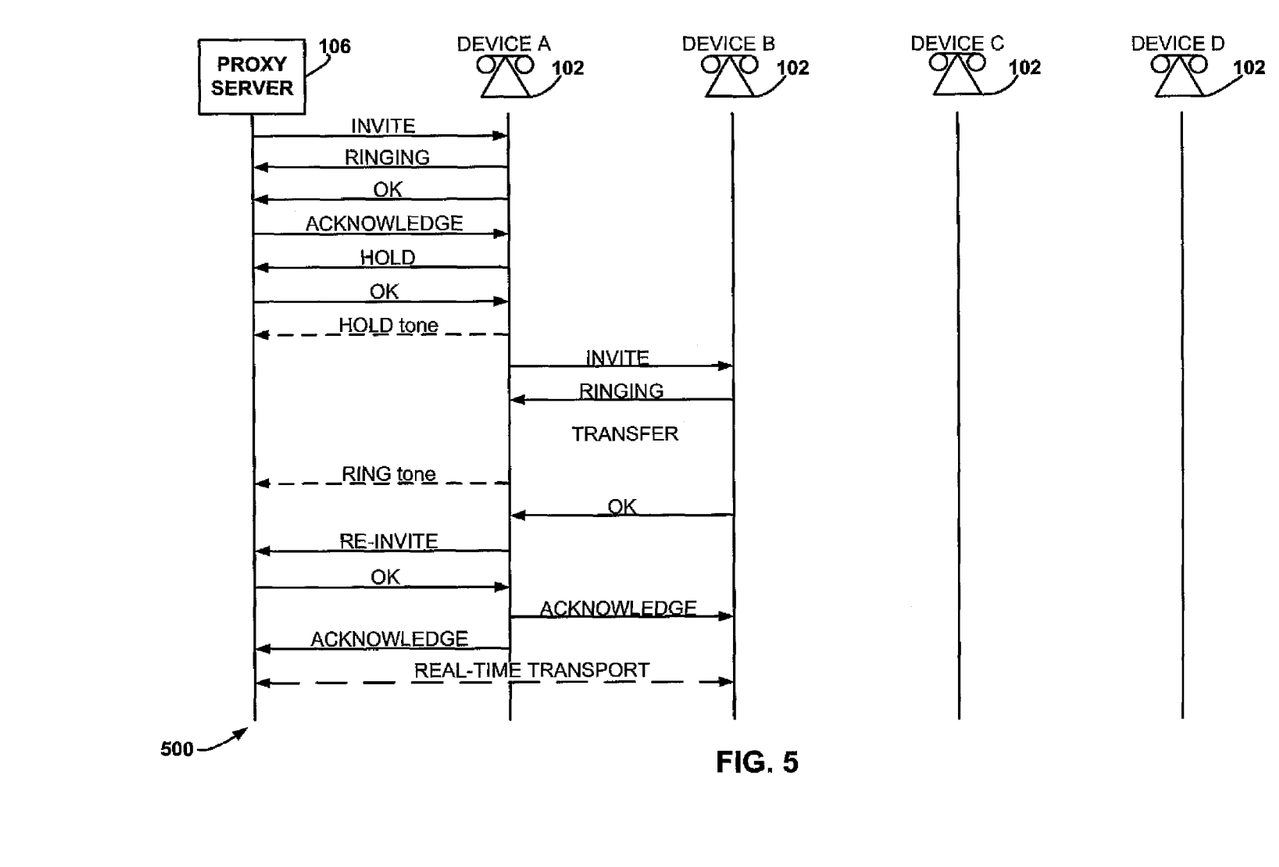
FIG. 5 is an overview of a flow for an incoming invitation being transferred in a back-to-back user agent implementation.

FIG. 5 illustrates a message flow 500 in the network 100 for an incoming invitation that is transferred from a receiving device to a destination device, such as when an incoming invitation is handled by an auto-attendant or a direct-inward-dial invitation is answered and then transferred. In FIG. 5 device A is selected as the receiving device who receives an incoming invitation destined for device B The proxy server 106 receives a media session invitation destined for one of the devices 102. An INVITE message is sent to device A, who sends back a RINGING message to the proxy server 106 and an OK message. The proxy server 106 sends an ACKNOWLEDGE message to device A and device A sends a HOLD message to the proxy server 106 who returns an OK message. Device A sends a hold tone to the proxy server 106 while device B is contacted.

Device A sends and INVITE message to device B who returns a RINGING message. Device A sends a ring tone to the proxy server 106 and device B sends an OK message to device A.

After device A receives the OK message from device B then device A sends a Re-INVITE message to the proxy server 106. The proxy server 106 responds by sending an OK message and device A sends an ACKNOWLEDGE message to device B and to the proxy server 106. Real-time transport of the voice data of the invitation is initiated between device B and the proxy server 106 with device A acting as a proxy between these two points.

The above example describes the back-to-back user agent method. Another implementation may choose to refer the proxy server 106 to the destination device 102 at which point the registered device 102 will no longer be involved in the call.

Figure 6:
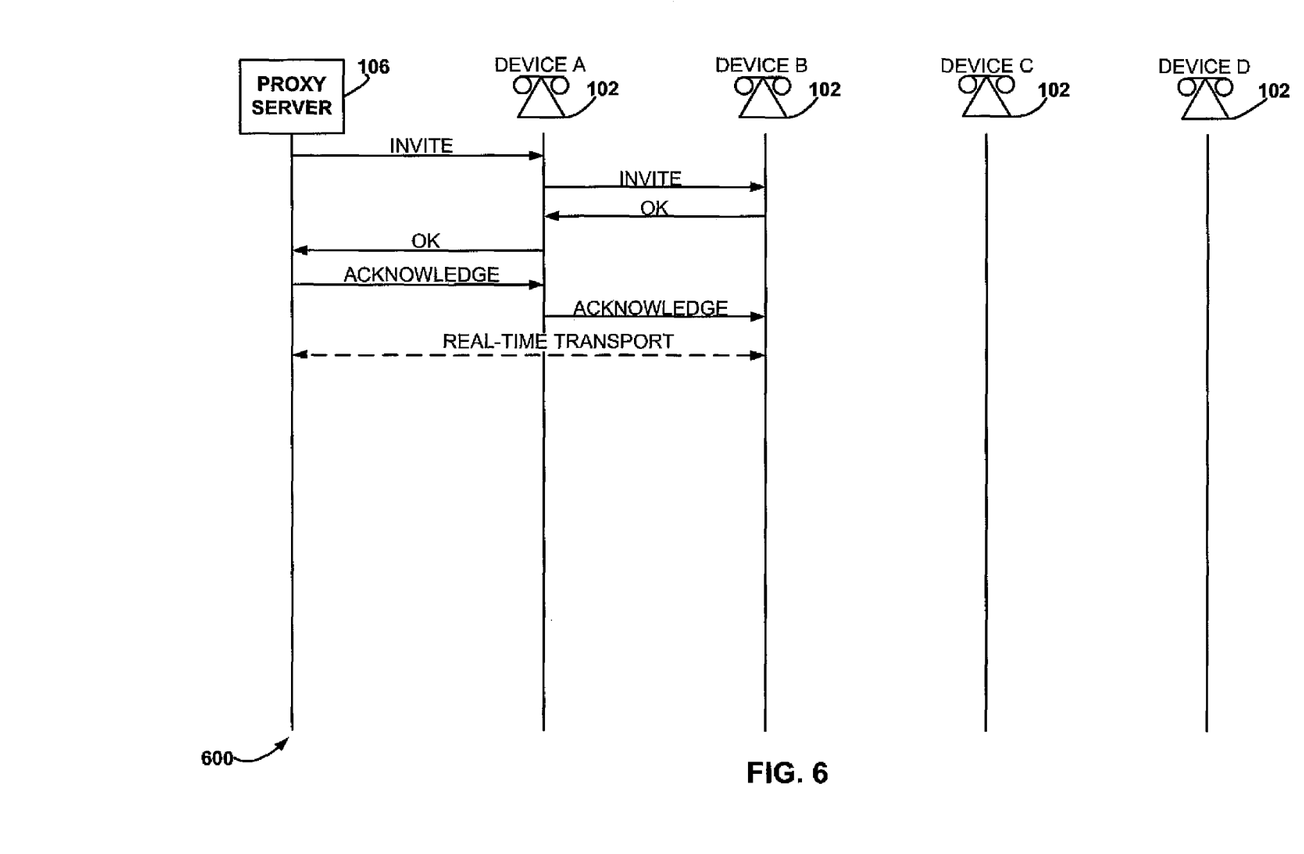
FIG. 6 is an overview of a flow for an incoming invitation being forwarded in a back-to-back user implementation.

FIG. 6 illustrates a message flow 600 in the network 100 for an incoming invitation that is forwarded from a receiving device to a destination device. In FIG. 6 device A is selected as the receiving device who receives an incoming invitation destined for device B.

The proxy server 106 receives a invitation destined for the customer. An INVITE message is sent to device A, who sends an INVITE message to device B. Device B returns an OK message to device A, who sends an OK message to the proxy server 106. The proxy server 106 returns an ACKNOWLEDGE message to device A, which prompts device A to send an ACKNOWLEDGE message to device B. Real-time transport of the voice data of the invitation is initiated between device B and the proxy server 106 with device A acting as a proxy between these two points.

The above example is also a back-to-back user agent method. Another implementation may redirect the incoming invitation to the destination device 102 using a SIP 3.xx message.

Figure 7:
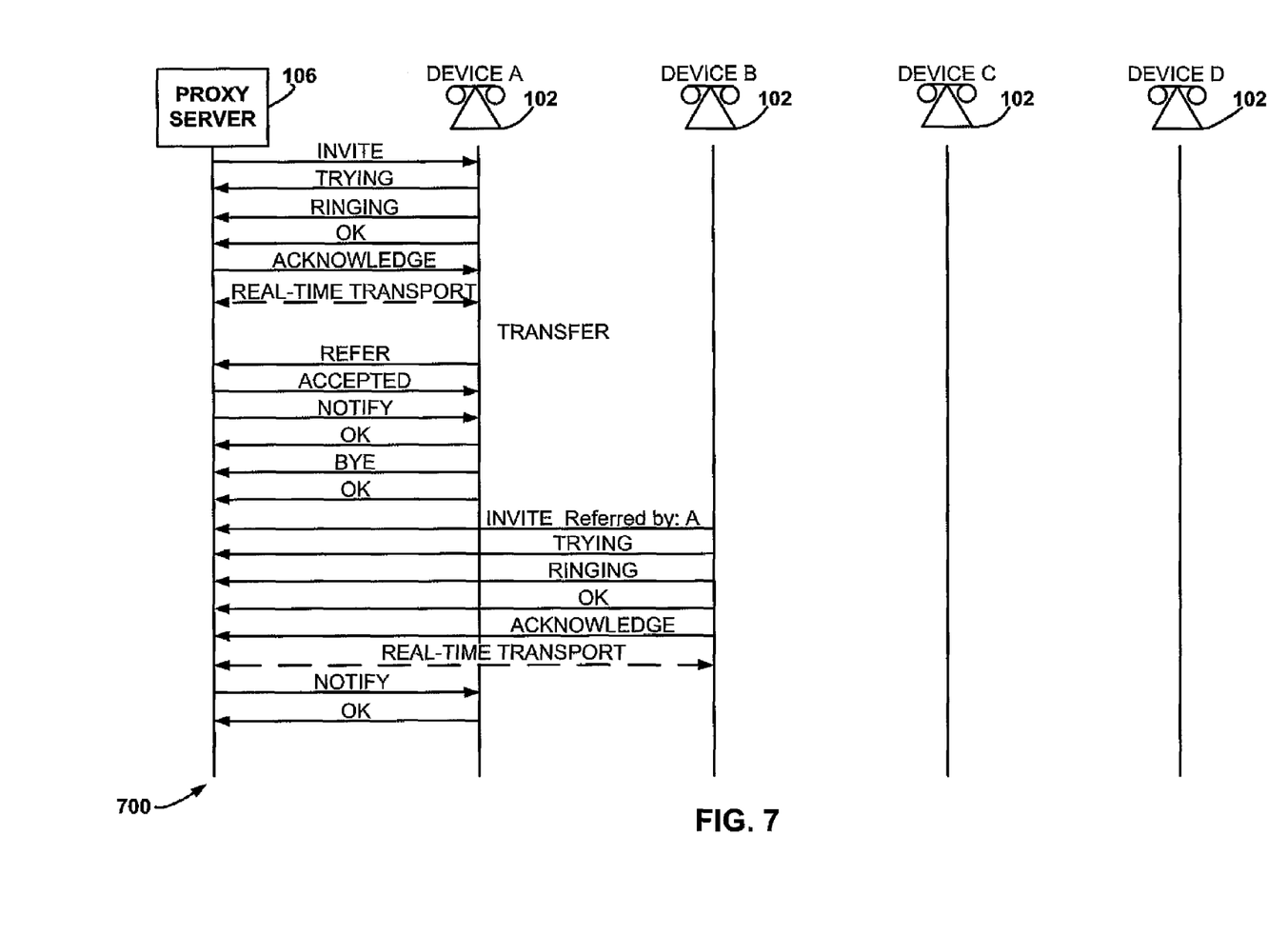
FIG. 7 is an overview of a flow for an incoming invitation being transferred in a redirecting method implementation.

FIG. 7 illustrates a message flow 700 in the network for an incoming invitation that is transferred from a receiving device to a destination device for a redirection implementation. In FIG. 7 device A is selected as the receiving device who receives an incoming invitation destined for device B.

The proxy server 106 receives a media session invitation destined for one of the devices 102. An INVITE message is sent to device A, who sends back TRYING, RINGING messages to the proxy server 106 and an OK message. The proxy server 106 sends an ACKNOWLEDGE message to device A and real-time transport between device A and the proxy server 106 is initiated in which device A obtain the destination of the invitation.

Device A sends a REFER message to the proxy server 106 identifying device B as the destination device for the invitation. The proxy server 106 sends ACKNOWLEDGE and NOTIFY messages to device A. Device A responds with OK and BYE messages. Communication between the proxy server 106 and device A is completed with an OK message from the proxy server 106.

The proxy server 106 begins communications with device B based on the previous refer message from device A with an INVITE message addressed to device B. Device B sends a TRYING, a RINGING and an OK message to the proxy server 106. The proxy server 106 sends an ACKNOWLEDGE message to device B. Real-time transport between the proxy server 106 and device B is initiated. To confirm that communications have been set up with device B, the proxy server 106 sends a NOTIFY message to device A who responds with an OK message.

In the above example the receiving device refers the proxy server 106 to the destination device 102 at which point the registered device 102 is no longer be involved in the call.

Figure 8:
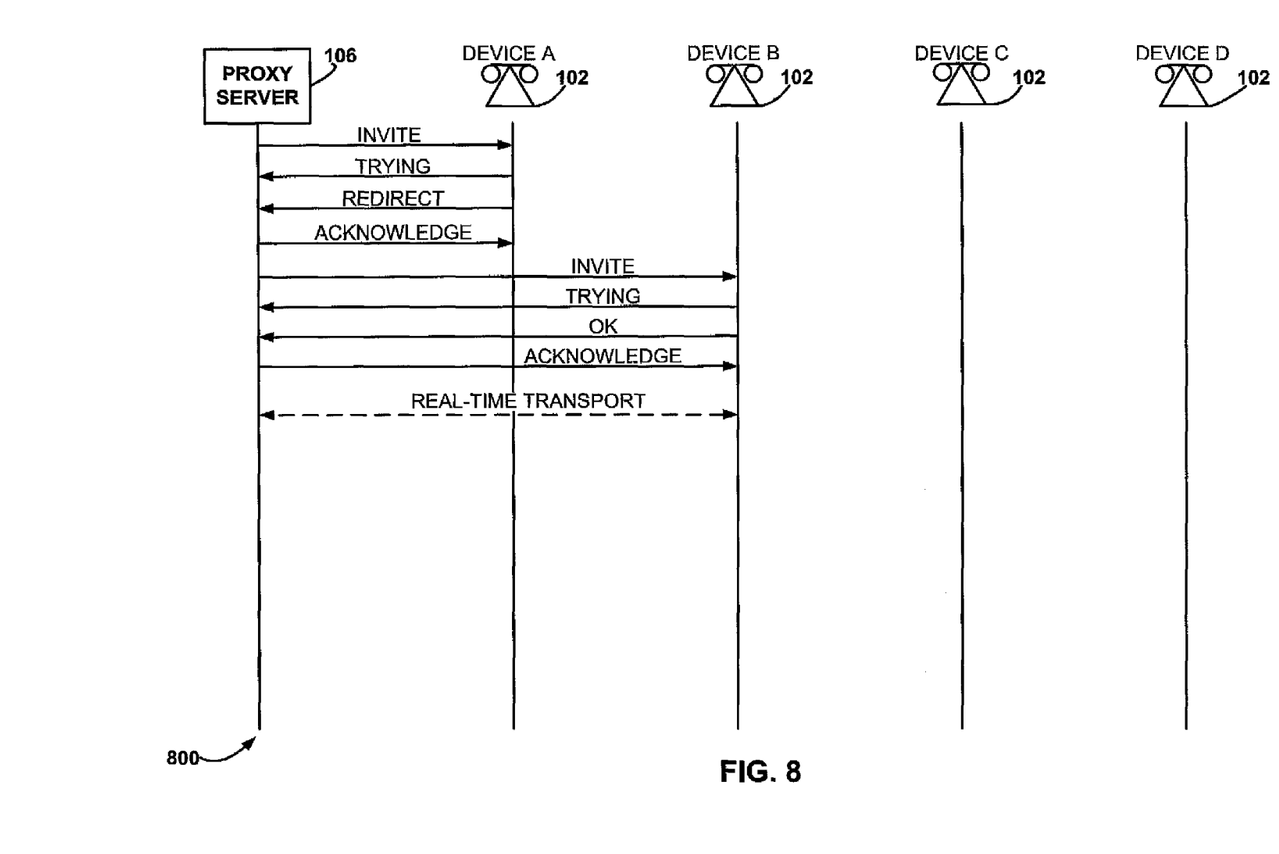
FIG. 8 is an overview of a flow for an incoming invitation being forwarded in a redirecting method implementation.

FIG. 8 illustrates a message flow 800 in the network 100 for an incoming invitation that is forwarded from a receiving device to a destination device in a redirection implementation. In FIG. 8 device A is selected as the receiving device who receives an incoming invitation destined for device B.

The proxy server 106 receives an invitation destined for one of the devices. An INVITE message is sent to device A, who sends a TRYING and a REDIRECT message to the proxy server 106. The proxy server 106 responds with an ACKNOWLEDGE message to device A. This redirects the proxy server 106 to send the invitation to device B as identified in the REDIRECT message from device A.

The proxy server 106 sends an INVITE message to device B. Device B returns a TRYING and an OK message to the proxy server 106, who sends an ACKNOWLEDGE message back to the proxy server 106. Real-time transport of the voice data of the invitation is initiated directly between device B and the proxy server 106.

Figure 9:
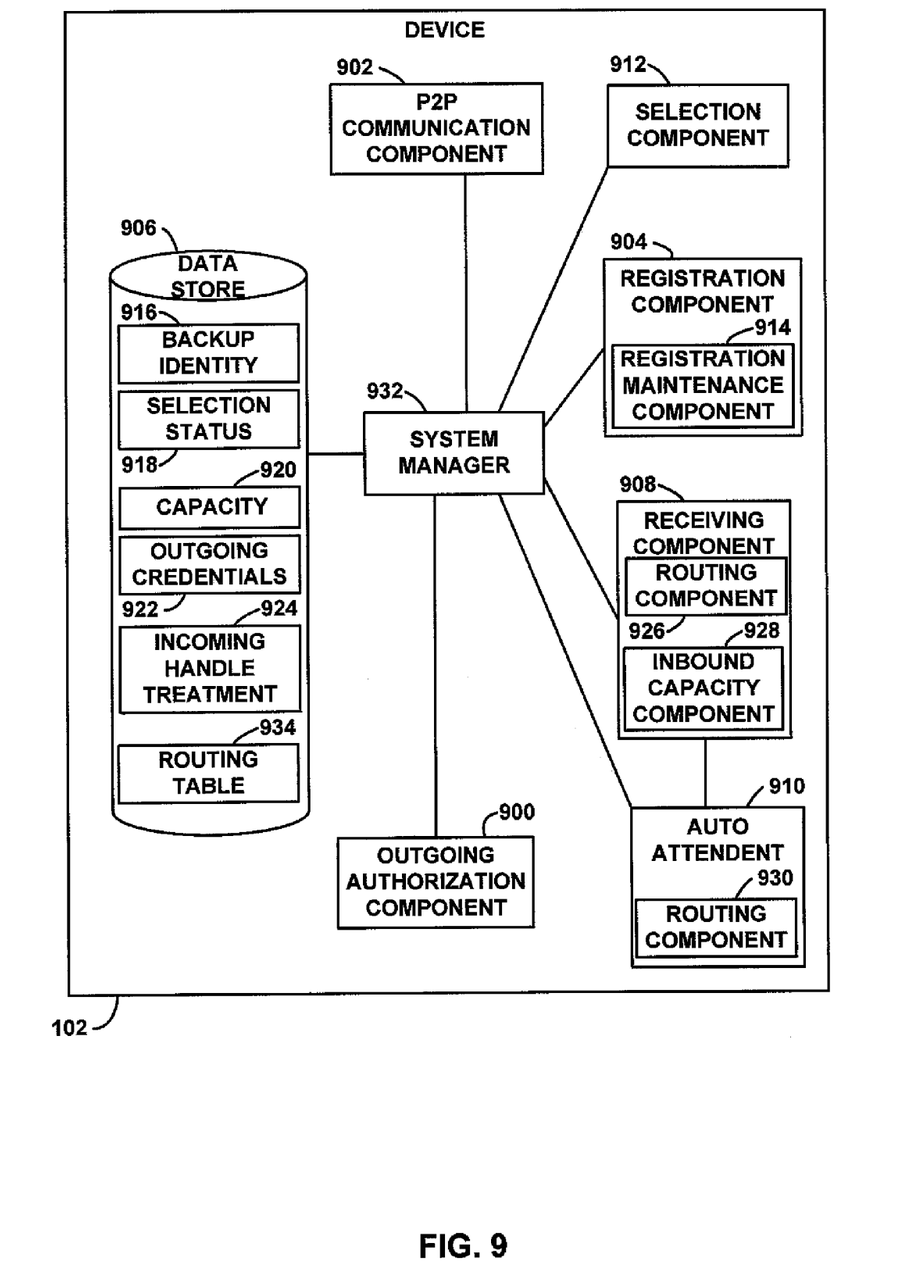
FIG. 9 is an overview of functional elements in the devices in the peer-to-peer network for implementing the flow of FIG. 3.

The above example is of a redirection implementation in which the incoming invitation is redirected from device A to device B by the proxy server 106 FIG. 9 is an overview of one of the devices 102 illustrating functional elements for implementing the flow 300 of FIG. 3. FIG. 9 does not illustrate all functional elements of the device 102 for simplicity.

The device 102 includes a system manager 932, an outgoing authorization component 900, a P2P (peer-to-peer) communication component 902, a registration component 904, a receiving component 908, an auto attendant 910, a monitoring component 936 and a data store 906.

The system manager 932 is in communication with the various other components in the device 102 to provide communication, scheduling and overall management of these components.

The data store 906 contains backup identity information 916 that indicates for which is devices on the network 100 the device 102 monitors status changes. The device 102 monitors the status of the devices for which it is a backup and may assume all of the functions of a device should that device be found to be inactive. The data store 906 also contains selection status information 918 which keeps track of whether the device 102 is the selected receiving device. Capacity information 920 is also included in the date store 906 to indicate the actual capacity of the device 102 and any defined limitations that may be separate from the actual capacity. The data store 906 further contains outgoing credentials information 922 that may be provided to the proxy server 106 when sending an invitation to a media session to a destination on the PSTN 114 that the device 102 is authorized to use the services of the service provider 104.

Incoming handle treatment information 924 contained in the data store 906 indicates how incoming invitations to media sessions are to be handled (e.g. invoke an auto-attendant 910, use a routing table 934, etc.). The routing table 934 is also included in the data store 906 and provides instructions on how incoming invitations are to be routed.

The P2P (peer-to-peer) communication component 902 enables communication of the device 102 with other peer devices on the network 100. In the network 100 all of the devices 102 communicate to share information, monitor the status of other devices 102 and select a receiving device. Such communication may occur, for example, by methods described in PCT publications WO 2005/050463, WO 2005/048531, and WO 2006/034563.

The selection component 912 determines the receiving device. In a case where all devices 120 on the network 100 communicate to collectively select a receiving device, the selection component 912 cooperates with the P2P communication component 902 to enable this selection and implement the selection algorithm. If the current receiving device chooses the next receiving device then the selection component 912 identifies the next receiving device and informs the next receiving device of this selection via the P2P communication component 902.

The outgoing authorization component 900 enables the device 102 to communicate with the proxy server 106 to make outgoing media session invitations. The outgoing authorization component 900 attempts to contact the proxy server 106 to make an outgoing invitation. The proxy server 106 will generally require that the device 102 provide credentials to conform that it is a valid user of the services provided by the service provider 104. The outgoing authorization component 900 provides the outgoing credentials 922 to the proxy server 106 during this authentication process.

The registration component 904 is activated when the device 102 is acting as the receiving device for the network 100. If the device 102 itself is selected to be the receiving device then a registration request is sent to the registration component 904. The registration component 904 will also indicate the selection status as the receiving device in the selection status information 918.

The registration component 904 also includes a registration maintenance component 914 that maintains the receiving device registration with the registration component 110, while it is the selected receiving device, according to guidelines set out by the service provider 104.

The monitoring component 936 monitors the devices 102 identified in the backup identity information 916 via the P2P communication component 902. When the monitoring component 936 detects that one of the devices 102 being monitored is inactive then it assume the identity of the inactive device 102 and activates the registration component 904 if the inactive device 102 is selected as the receiving device so that a new receiving device is registered. The device 102 may alternatively activate the selection component 912 to select another receiving device if the inactive device 102 was the selected device.

The receiving component 908 is activated when the device 102 is acting as the receiving device and an incoming media session invitation is sent from the proxy server 106. The receiving component 908 examines the incoming handle treatment information 924 in the data store 906 to determine how an incoming invitation is to be handled (e.g. auto attendant, routing table, etc.). If the invitation is to be processed by an auto-attendant then the auto-attendant 910 is activated by the receiving component 908. The receiving component 908 includes a routing component 926 and an inbound capacity component 928. If the invitation is handled according to the routing table 934, the routing component 926 routes the invitation to the destination device.

Each device 102 in the network 100, has a corresponding entry in the routing table 934 that includes fields such as: unique device identifier, unique user identifier, device status, current address, device identifiers of the backup devices, etc. When an invitation is received, the receiving component 908 extracts a destination for the invitation and locates an entry in the routing table 934 whose user identifier matches the destination. If the routing table entry indicates that the device is active then it will route the invitation to that device 102. If the device is inactive, the entries for the backup devices are located in the routing table 934 and if one of them is active, then the invitation will be forwarded to the active backup device.

Upon receipt of an incoming invitation, the inbound capacity component 928 examines the capacity information 920 in the data store to determine if a capacity for the device 102 has been reached. If the capacity has been reached then the selection component 912 is activated to select another device 102 as the receiving device. The inbound capacity component 928 compares the capacity information 920 against current conditions of the device 102.

The auto-attendant 910 processes invitations and routes these invitations using a routing component 930 contained therein.

It is apparent to one skilled in the art that numerous modifications and departures from the specific embodiments described herein may be made without departing from the spirit and scope of the invention.

The invention claimed is:

1. A method of enabling direct communication between a service provider that is in communication with a PSTN (public switched telephone network) and a plurality of devices on a peer-to-peer network, said method comprising:
selecting one of the plurality of devices on the peer-to-peer network for receiving all incoming invitations for media sessions directly from the service provider, the incoming invitations originating from an external network with which the service provider is communicating and being addressed to any one of the plurality of devices, wherein the peer-to-peer network does not include a PBX (private branch exchange) and each of the plurality of devices is configured to be used as a telephone;
transmitting an incoming point registration message to the service provider indicating a unique address of the selected device to which all incoming invitations from the service provider are to be sent, the unique address being associated with a first identifier for at least one of the plurality of devices by the service provider, wherein only the selected device transmits the incoming point registration message;
detecting when a capacity criteria of the selected device has been reached; and
selecting, upon detection of the capacity criteria being reached, another one of the plurality of devices in place of the selected device to distribute a load associated with receiving all incoming invitations among the plurality of devices, the selected device receiving all subsequent incoming invitations for media sessions directly from the service provider upon detection of a reselection condition, the subsequent incoming invitations being addressed to any one of the plurality of devices,
wherein the selected another device transmits a subsequent incoming point registration message to the service provider.

2. The method of claim 1 wherein said selecting one of the plurality of devices comprises communicating with others of the plurality of devices to select the selected device according to a selection criteria comprising at least one of device capabilities, location of device in the network, device status, and a predetermined ordering of the plurality of devices.

3. The method of claim 1 wherein the unique address of the selected device is an Internet Protocol (IP) address, the external network is the public switch telephone network (PSTN) and said media session is a voice over IP call, and wherein said first identifier for at least one of the plurality of devices is a Uniform Resource Identifier (URI) of the format "name@domain", the name representing an second identifier for at least one of the plurality of devices where the second identifier is used by devices external to the service provider to send invitations to the at least one of the plurality of devices identified by the second identifier through the service provider, the domain representing an identity of the service provider.

4. The method of claim 1 wherein said transmitting an incoming point registration message comprises periodically transmitting an incoming point registration message to the service provider.

5. The method of claim 1 wherein said selecting another one of the plurality of devices comprises communicating with others of the plurality of devices to select the selected another device according to a selection criteria comprising at least one of device capabilities, location of device in the network, device status, and a predetermined ordering of the plurality of devices.

6. The method of claim 1 wherein said capacity criteria is at least one of the selected device receiving an incoming invitation for a media session and the selected device exceeding a predetermined threshold of consumed resources.

7. The method of claim 1 further comprising:
receiving an incoming invitation for a media session at the selected device from the service provider, the incoming invitation being addressed to one of the plurality of devices;
processing the incoming invitation at the selected device to determine the addressed device; and
routing the incoming invitation by the selected device to the addressed device.

8. The method of claim 7 wherein said routing comprises routing the incoming invitation through the selected device where the selected device is a Back-to-Back User Agent (B2BUA) and the selected device remains in a communication path of the incoming invitation and subsequent communications between the addressed device and the service provider.

9. The method of claim 7 wherein said routing comprises transmitting a redirect message to the service provider indicating a unique address for the addressed device to enable the service provider to send the incoming invitation directly to the addressed device.

10. A hardware device in communication with a plurality of hardware devices on a peer-to-peer network comprising:
a selection component for selecting one of the plurality of hardware devices on the peer-to-peer network for receiving all incoming invitations for media sessions directly from a service provider that is in communication with a PSTN (Public switched telephone network), the selection component being activated for selecting one of the plurality of hardware devices when there is not a previous selection and for reselection of one of the plurality of hardware devices, the incoming invitations originating from an external network with which the service provider is in communication and being addressed to any one of the plurality of hardware devices, wherein the peer-to-peer network does not include a PBX (private branch exchange) and each of the plurality of hardware devices is configured to be used as a telephone;
a registration component for transmitting an incoming point registration message to the service provider indicating a unique address of the selected hardware device to which all incoming invitations from the service provider are to be sent, the unique address being associated with a first identifier for at least one of the plurality of hardware devices by the service provider, wherein the incoming point registration message is only transmitted if the hardware device is the selected hardware device;
a receiving component for receiving and processing an incoming invitation for a media session from the service provider, the invitation being addressed to any one of the plurality of hardware devices, the receiving component comprising an inbound capacity component for detecting when a capacity criteria of the hardware device has been reached and activating the selection component upon such detection for reselection so that another of the plurality of hardware devices is selected to receive all subsequent incoming invitations for media sessions in order to distribute a load associated with receiving all incoming invitations among the plurality of hardware devices; and
a system manager for scheduling and managing the hardware device.

11. The hardware device of claim 10 further comprising a communication component for enabling communication with others of the plurality of hardware devices, the communication component cooperating with the selection component for communicating with the others of the plurality of hardware devices to select the selected hardware device according to a selection algorithm.

12. The hardware device of claim 10 wherein the receiving component further comprises a routing component for routing the incoming invitation to the addressed hardware device.

13. The hardware device of claim 10 wherein the capacity criteria is at least one of a receipt of an invitation for a media session by the selected hardware device and detecting an exceeding a predestined threshold of consumed resources at the selected hardware device.

14. The hardware device of claim 10 further comprising a monitoring component for monitoring the status of at least another one of the plurality of hardware devices to detect an inactive status and activating one of the selection component and the registration component upon detection of the inactive status.

15. The hardware device of claim 10 further comprising an auto-attendant for processing and routing the invitation to the addressed hardware device.

16. An article of manufacture comprising:
a non-transitory computer usable medium having computer readable program code means embodied therein for causing enablement of direct communication between a service provider that is in communication with a PSTN (public switched telephone network) and a plurality of devices on a peer-to-peer network, the computer readable program code means in said article of manufacture comprising:
computer readable program code means for causing a device to select one of the plurality of devices on the peer-to-peer network for receiving all incoming invitations for media sessions directly from the service provider, the incoming invitations originating from an external network with which the service provider is communicating and being addressed to any one of the plurality of devices, wherein the peer-to-peer network does not include a PBX (private branch exchange) and each of the plurality of devices is configured to be used as a telephone;
computer readable program code means for causing a device to transmit an incoming point registration message to the service provider indicating a unique address of the selected device to which all incoming invitations from the service provider are to be sent, the unique address being associated with a first identifier for at least one of the plurality of devices by the service provider, wherein only the selected device transmits the incoming point registration message;
computer readable program code means for causing a device to detect when a capacity criteria of the selected device has been reached; and
computer readable program code means for causing a device to select, upon detection that the capacity criteria has been reached, another one of the plurality of devices in place of the selected device to distribute a load associated with receiving all incoming invitations among the plurality of devices, the selected another device receiving all subsequent incoming invitations for media sessions directly from the service provider, the subsequent incoming invitations being addressed to any one of the plurality of devices, wherein the selected another device transmits a subsequent incoming point registration message to the service provider.

17. The article of manufacture of claim 16 wherein said code means for causing a device to select one of the plurality of devices comprises computer readable program code means for causing a device to communicate with others of the plurality of devices to select the selected device according to a selection criteria comprising at least one of device capabilities, location of device in the network, device status, and a predetermined ordering of the plurality of devices, and wherein the capacity criteria is at least one of the selected device receiving an incoming invitation for a media session and detecting an exceeding a predestined threshold of consumed resources at the selected device and wherein said code means for causing a device to select another one of the plurality of devices comprises computer readable program code means for causing a device to communicate with others of the plurality of devices to select the selected another device according to a selection criteria comprising at least one of device capabilities, location of device in the network, device status, and a predetermined ordering of the plurality of devices.

18. The article of manufacture of claim 16 wherein the external network is a public switch telephone network (PSTN) and said media session is a voice over IP call, wherein the unique address of the selected device is an Internet Protocol (IP) address, and wherein said first identifier for at least one of the plurality of devices is a Uniform Resource Identifier (URI) of the format "name@domain", the name representing a second identifier for at least one of the plurality of devices where the second identifier is used by devices external to the service provider to send invitations to the at least one of the plurality of devices identified by the second identifier through the service provider, the domain representing an identity of the service provider.

19. The article of manufacture of claim 16 wherein said code means for causing a device to transmit an incoming point registration message comprises computer readable program code means for causing a device to periodically transmit an incoming point registration message to the service provider.

20. The article of manufacture of claim 16 further comprising:

computer readable program code means for causing a device to receive an incoming invitation for a media session at the selected device from the service provider, the incoming invitation being addressed to one of the plurality of devices;

computer readable program code means for causing a device to process the incoming invitation to determine the addressed device; and computer readable program code means for causing a device to route the incoming invitation by the selected device to the addressed device.

21. The article of manufacture of claim 20 wherein said code means for causing a device to route comprises computer readable program code means for causing a device to route the invitation through the selected device where the selected device is a Back-to-Back User Agent (B2BUA) and the selected device remains in a communication path of the incoming invitation and subsequent communications between the addressed device and the service provider.

22. The article of manufacture of claim 20 wherein said code means for causing a device to route comprises computer readable program code means for causing a device to transmit a redirect message to the service provider indicating a unique address for the addressed device to enable the service provider to send the invitation directly to the addressed device.

23. The method of claim 1, wherein the devices are selected from the group consisting of IP telephones, video phones, personal digital assistants, and wireless devices.

24. The device of claim 10, wherein the plurality of devices are selected from the group consisting of IP telephones, video phones, personal digital assistants, and wireless devices.

25. The article of manufacture of claim 16, wherein the plurality of devices are selected from the group consisting of IP telephones, video phones, personal digital assistants, and wireless devices.

* * * * *